United States Patent
Kaiser et al.

(10) Patent No.: US 8,607,555 B2
(45) Date of Patent: Dec. 17, 2013

(54) MIXING ELEMENT AND AN EXHAUST SYSTEM FOR AN INTERNAL COMBUSTION ENGINE

(75) Inventors: Rolf Kaiser, Augsburg (DE); Klaus Rusch, Gersthofen (DE); Florian Stadler, Ingolstadt (DE)

(73) Assignee: Faurecia Emissions Control Technologies GmbH, Augsburg (DE)

( * ) Notice: Subject to any disclaimer, the term of this patent is extended or adjusted under 35 U.S.C. 154(b) by 937 days.

(21) Appl. No.: 12/515,595

(22) PCT Filed: Nov. 21, 2007

(86) PCT No.: PCT/EP2007/010087
§ 371 (c)(1),
(2), (4) Date: Dec. 21, 2009

(87) PCT Pub. No.: WO2008/061734
PCT Pub. Date: May 29, 2008

(65) Prior Publication Data
US 2010/0107617 A1    May 6, 2010

(30) Foreign Application Priority Data

Nov. 22, 2006 (DE) .......................... 10 2006 055 036

(51) Int. Cl.
*F01N 1/00* (2006.01)
*F01N 3/00* (2006.01)
*F01N 3/10* (2006.01)

(52) U.S. Cl.
USPC ................... 60/324; 60/286; 60/295; 60/303

(58) Field of Classification Search
USPC ..................... 60/286, 295, 303, 324
See application file for complete search history.

(56) References Cited

U.S. PATENT DOCUMENTS

| | | | | |
|---|---|---|---|---|
| 4,530,418 | A * | 7/1985 | Currie ........................... | 181/227 |
| 6,074,619 | A * | 6/2000 | Schoubye .................. | 423/239.1 |
| 6,367,320 | B1 * | 4/2002 | Kueper et al. ............. | 73/114.71 |
| 6,401,455 | B1 * | 6/2002 | Mathes et al. .................. | 60/286 |
| 7,533,520 | B2 * | 5/2009 | Cheng et al. .................... | 60/286 |
| 7,581,387 | B2 * | 9/2009 | Bui et al. ........................ | 60/286 |
| 7,784,273 | B2 * | 8/2010 | Kanaya et al. ................. | 60/286 |
| 7,908,845 | B2 * | 3/2011 | Brown et al. ................... | 60/286 |

FOREIGN PATENT DOCUMENTS

| | | |
|---|---|---|
| DE | 19741199 | 4/1999 |
| DE | 4313393 | 6/2003 |
| EP | 1424488 | 6/2004 |
| EP | 1712756 | 10/2006 |

OTHER PUBLICATIONS

International Search Report dated Feb. 6, 2008.
International Preliminary Report on Patentability—English Translation, issued on Jun. 10, 2009.

\* cited by examiner

*Primary Examiner* — Thomas E. Denion
*Assistant Examiner* — Diem Tran
(74) *Attorney, Agent, or Firm* — Carlson, Gaskey & Olds (57) ABSTRACT

A mixing element has a grid which includes a plurality of rows parallel to each other and a plurality of deflector elements which project from the grid and are inclined in relation to the grid plane normal. All deflector elements of one row are inclined in the same direction. The deflector elements of at least two immediately adjacent first rows are inclined in the same direction. The mixing element is used in an exhaust system of an internal combustion engine.

18 Claims, 5 Drawing Sheets

MIXING ELEMENT AND AN EXHAUST SYSTEM FOR AN INTERNAL COMBUSTION ENGINE

RELATED APPLICATION

This application is the U.S. national phase of PCT/EP2007/010087, which was filed Nov. 21, 2007, which claimed priority to DE 10 2006 055 036.6, which was filed Nov. 22, 2006.

FIELD OF THE INVENTION

The present invention relates to a mixing element, in particular for arrangement in an exhaust system of an internal combustion engine, including a grid which includes a plurality of rows parallel to each other and a plurality of deflector elements which project from the grid and are inclined in relation to the grid plane normal, with all of the deflector elements of one row being inclined in the same direction. According to a further aspect, the present invention relates to a mixing element including a grid which includes a plurality of rows parallel to each other and a plurality of deflector elements which project from the grid and are inclined in relation to the grid plane normal, and which includes at least one field having deflector elements inclined in the same direction that is formed by at least four adjacent deflector elements. Another aspect of the invention provides a mixing element including a grid which includes a plurality of rows parallel to each other and a plurality of deflector elements which project from the grid and are inclined in relation to the grid plane normal. In addition, the present invention relates to an exhaust system for an internal combustion engine.

BACKGROUND OF THE INVENTION

A generic mixing element is disclosed in DE 43 13 393 C2 and serves to distribute a medium introduced into a conduit in a flowing medium as homogeneously as possible. In particular, the mixing element is used to mix an exhaust gas stream containing nitrogen oxide with ammonia. In a $DeNO_x$ catalytic converter connected downstream, the nitrogen oxides and the ammonia are catalytically converted into water and nitrogen according to the method of selective catalytic reduction. In the mixing element described in the prior art, the deflector elements of immediately adjacent rows are inclined in opposite directions and arranged offset in relation to each other.

SUMMARY OF THE INVENTION

The invention provides a mixing element which distinguishes itself over the prior art by an improved mixing of an introduced substance with a flowing medium.

According to a first aspect of the invention, in a mixing element of the kind mentioned at the outset, this is achieved in that the deflector elements of at least two immediately adjacent first rows are inclined in the same direction. It has been found totally surprisingly in tests that although the deflector elements of the adjacent first rows are inclined in the same way, the mixing element according to the invention achieves better mixing values than the mixing element in the prior art. Further, the mixing element is simpler to produce because for chamfering the closely adjacent deflector elements, it is simpler if neighboring deflector elements can be bent in the same direction. The invention in particular allows a more uniform distribution of a liquid medium in a gas stream to be reached. This is of advantage above all in an exhaust system of an internal combustion engine having a SCR catalytic converter, which requires ammonia for the conversion of nitrogen oxides. For this purpose, an aqueous urea solution is introduced into the exhaust system. It is important to note that even the largest drops of the urea solution are vaporized upstream of the SCR catalytic converter and are converted into ammonia gas by thermolysis. Any residual drops might damage the catalytic converter substrate or cling to the colder walls of the tube through which the exhaust gas flows. This may result in the deposited urea chipping off and causing damage to the catalytic converter. This is prevented by the mixing element according to the invention. Owing to their low thermally active mass, the deflector elements heat up quickly in the hot exhaust gas stream and small droplets are vaporized when they come into contact with the surface of the deflector elements. Larger drops impinge on the surface of the deflector elements and, due to their high kinetic energy, burst into many small droplets which are likewise reliably vaporized. The orientation of the rows described in the present invention need not necessarily lead to a very exact parallel orientation. A slightly oblique position is quite possible.

Preferably, the adjacent deflector elements of the first rows are oriented parallel to each other. In this connection, the adjacent deflector elements are intended to mean those which are positioned immediately next to each other perpendicularly to the longitudinal direction of the rows.

According to an embodiment of the invention, the first rows are middle rows having an especially intensive flow therethrough.

As an alternative, the first rows can be rows which are arranged on the same side of a center axis extending parallel to the longitudinal direction of the rows, i.e., shifted laterally in relation to the center axis.

The deflector elements may be inclined in the longitudinal direction of the rows.

It is also conceivable that the deflector elements are inclined perpendicularly to the longitudinal direction of the rows.

In the latter case, the free ends of the deflector elements may point towards or away from the center axis, depending on the desired influence on the flow.

According to one variant, the deflector elements of the rows adjacent to the first rows are inclined in the opposite direction to those of the first rows. Generally, it is decisive that at least two neighboring rows include deflector elements inclined in the same direction. The adjacent rows may be made up of deflector elements inclined in the opposite or in the same direction.

Preferably, the grid includes exactly two first rows.

Depending on the desired swirl, all deflector elements of one row may have the same angle of inclination.

A particularly uniform mixing of the media may be achieved, for example, in that the mixing element is designed to be axially symmetrical to a center axis extending parallel to the longitudinal direction of the rows.

A second aspect of the invention provides a mixing element having a grid which includes a plurality of rows parallel to each other and a plurality of deflector elements which project from the grid and are inclined in relation to the grid plane normal. At least one field has deflector elements inclined in the same direction which is formed by at least four adjacent deflector elements. Here, not all of the deflector elements of the field are arranged in one row. In this connection, the term "adjacent" means that each deflector element is positioned immediately next to at least one other deflector element. This configuration having one or more fields of deflector elements inclined in the same direction also allows a mixing of two media to be obtained which is improved as compared to the prior art.

A preferred variant here provides that the deflector elements of the field are arranged in a T-shape.

In a further preferred variant, the deflector elements of the field form a rectangle, in particular a square.

Provision may be made for two fields having deflector elements inclined in opposite directions, which provide for a strong swirl.

According to a third aspect of the invention, the object initially mentioned is achieved by a mixing element, in particular for arrangement in an exhaust system of an internal combustion engine. The mixing element includes a grid with a plurality of rows parallel to each other and a plurality of deflector elements which project from the grid and are inclined in relation to the grid plane normal. At least one eddy-forming portion is provided which is constituted by at least four adjacent fields which are each made up of a plurality of adjacent deflector elements inclined in the same direction. The fields are arranged in a circular manner with respect to the inclination of the deflector elements thereof, by deflector elements of the portion adjacent in the direction of rotation of the eddy being oriented to be turned through a maximum of 90 degrees in relation to each other. The deflector elements which are part of the portion cause the media to rotate and thereby enhance the mixing thereof. Here, the entire area of the mixing element may be formed as one large eddy-forming portion or only a central part of the mixing element. It is also conceivable to arrange a plurality of eddy-forming portions in such a way that a plurality of eddies are formed that are oriented in the same direction or in opposite directions.

Preferably, four fields formed by deflector elements are provided, which are arranged rotationally symmetrically to a center of the grid. The deflector elements arranged in this manner generate an eddy around the center of the grid.

The angle of inclination of the deflector elements should amount to between 10 degrees and 60 degrees to the grid plane normal, preferably about 45 degrees. In this way, a high swirling and thus a good mixing of the media is achieved. At the same time, the counterpressure produced in the flowing medium by a mixing element of such type is comparatively low.

A particularly simple configuration, which is therefore inexpensive to produce, is obtained in that the grid is formed by a plurality of flat first and second webs, the first webs being arranged perpendicularly to the second webs.

Preferably, the first webs define the rows and the deflector elements are attached to the second webs. The deflector elements may just as well be attached to the first rows, in particular in the case of deflector elements which are inclined perpendicularly to the longitudinal direction of the rows.

In the mixing element according to the invention, low manufacturing costs are attained in that the first and second webs are inserted into each other and welded or soldered to each other.

The deflector elements may be formed in one piece with the grid. Alternatively, the deflector elements are connected to the grid by welding or soldering.

More particularly, the deflector elements (and, if desired, the associated webs) are in the form of stamped metal parts.

A strong swirling, which is particularly favorable to the mixing of the media, may be achieved if the edges of the deflector elements are made to be sharp, i.e. without a finishing machining step after the stamping process.

In order to keep the counterpressure generated by the mixing element low and, at the same time, to favor the formation of secondary eddies, the deflector elements may be tapered in the direction away from the grid.

More particularly, the deflector elements have a trapezoidal shape, the base of the trapezoid being connected to the grid.

The length of the deflector elements substantially corresponds to the width of the rows or is at least of the same order of magnitude.

Of course, the deflector elements in the edge region of the grid may have a different angle of inclination from those in the central region. In this way, the mixing attained by the mixing element may be systematically influenced In order to improve the chemical conversion of, for example, urea solution into ammonia, the deflector elements may include a catalytically active coating.

The mixing element according to the invention is preferably used in an exhaust system for an internal combustion engine, which, in addition to the mixing element described above, includes a tube through which exhaust gas flows and a supply for a reducing agent. More particularly, the mixing element is arranged downstream of the supply.

It has turned out that a particularly good mixing of the reducing agent with the exhaust gas stream may be attained in that the tube is angled upstream of the mixing element. In this way, the exhaust gas is forced to change direction immediately upstream of the mixing element. This, however, is not absolutely necessary in each case of application.

Preferably, the tube is angled between 15 degrees and 60 degrees in relation to the grid plane normal.

The reducing agent is supplied more particularly at an angle of between 15 degrees and 60 degrees in relation to the inflow direction of the exhaust gas. This is aimed at obtaining a total wetting of all deflector elements at each operating point.

These and other features of the present invention can be best understood from the following specification and drawings, the following of which is a brief description.

BRIEF DESCRIPTION OF THE DRAWINGS

Further features and advantages of the invention will be apparent from the following description of a embodiment with reference to the accompanying drawings, in which.

DETAILED DESCRIPTION OF THE EMBODIMENT

Figure 1:
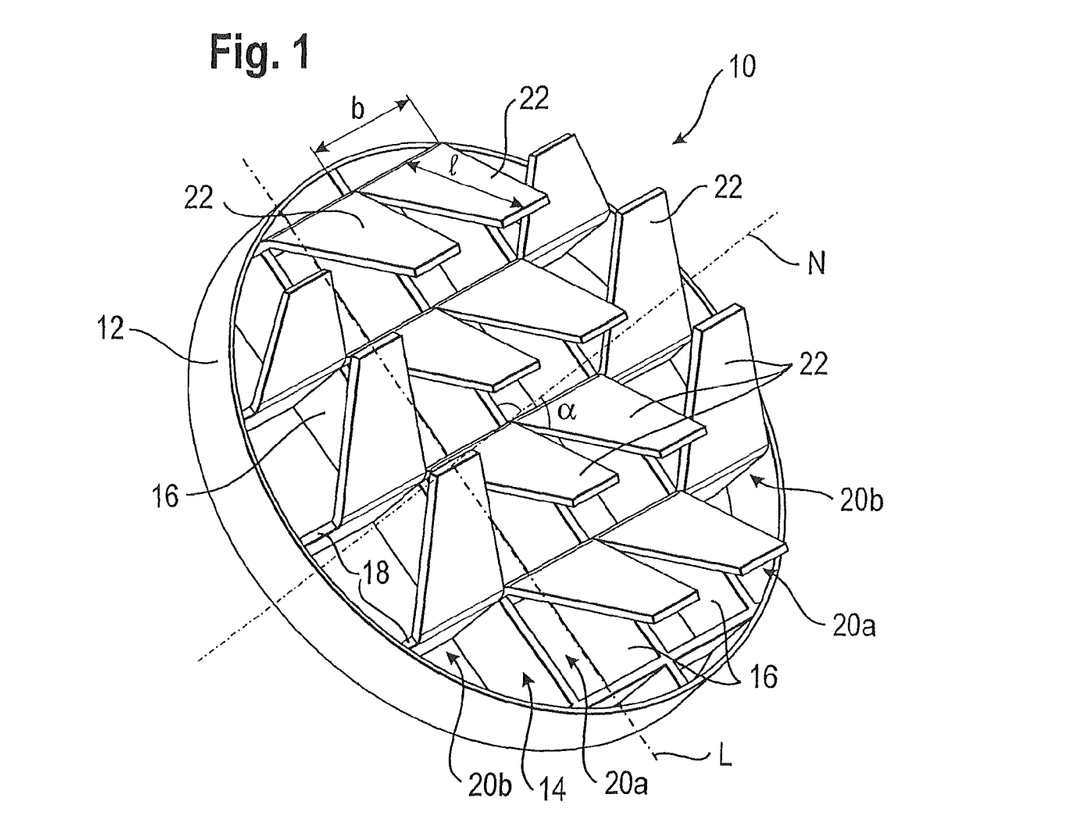
FIG. 1 shows a perspective view of a mixing element according to a first embodiment of the invention.

FIG. 1 shows a stationary mixing element 10 according to the invention which includes a grid 14 which is delimited by an annular frame 12 and is formed by a plurality of first webs 16 having a parallel orientation and second webs 18 arranged perpendicularly thereto. The first webs 16 define a plurality of rows 20a, 20b which are parallel to each other, the two outermost rows 20b being delimited on the outer side by the frame 12 itself. It would, of course, also be possible to configure the rows 20a, 20b so as not to be precisely parallel.

Figure 2:
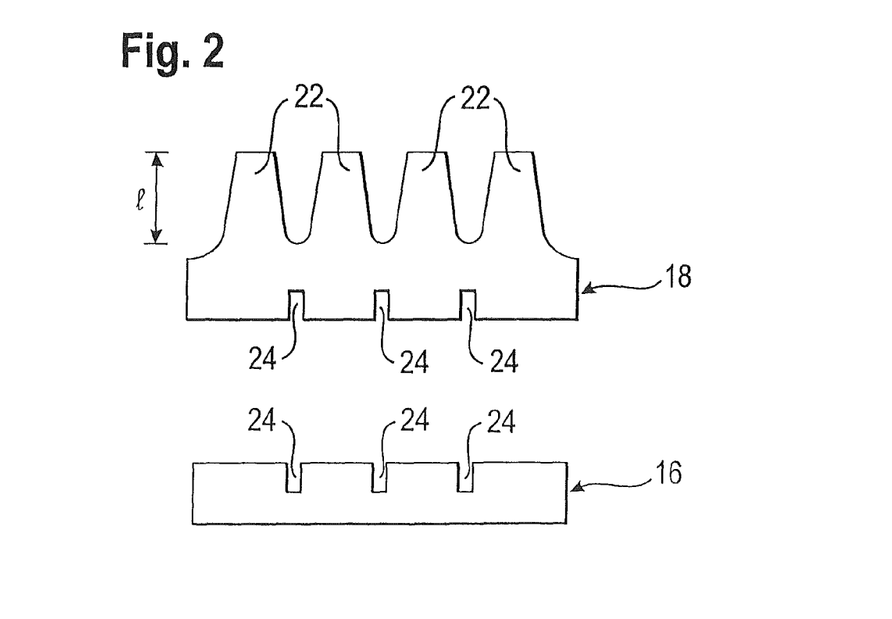
FIG. 2 shows views of a first and a second web, which constitute the grid of the mixing element of FIG. 1.

Projecting from the grid 14 is a plurality of deflector elements 22 which are attached to the second webs 18, more particularly formed in one piece therewith (and thus with the grid 14). The length l (FIG. 2) of the deflector elements 22 substantially corresponds to the width b of the rows 20a, 20b.

For the manufacture of the mixing element 10, the first webs 16 and the second webs 18 along with the deflector elements 22 are produced as stamped metal parts. As is apparent from FIG. 2, both the first webs 16 and the second webs 18 include a plurality of slots 24 which are used to insert the first and second webs 16 and 18 into each other. The grid 14 is then welded or soldered at the points of intersection and the frame 12 is welded or soldered to the grid 14.

In particular in the region of the deflector elements 22, the edges of the mixing element 10 are made to be sharp, which may be achieved, for example, in that no finishing machining step is performed after the stamping process.

Either before or after the first and second webs 16, 18 are assembled to form the grid 14, the deflector elements 22, which have a trapezoidal shape and are tapered in the direction away from the grid 14, are bent out of the grid plane normal N by 10 degrees to 60 degrees in the longitudinal direction of the rows, in this case preferably by approximately 45 degrees, so that in the finished mixing element 10 the deflector elements 22 are inclined in relation to the grid plane normal N. Here, all of the deflector elements 22 of one row 20a, 20b are inclined in the same direction and, in addition, have the same angle of inclination a to the grid plane normal N. In an alternative configuration which is not shown, the deflector elements in an edge region of the grid 14 may have a different angle of inclination than the deflector elements in a central region.

As can be seen in FIG. 1, the deflector elements 22 of the two immediately adjacent first rows 20a, which in this case constitute the middle rows, are inclined in the same direction and the deflector elements 22 of the second rows 20b (in this case the outer rows) adjacent to the first rows 20a are inclined in the opposite direction thereto. In particular, two respective adjacent deflector elements 22 (perpendicular to the longitudinal direction L of the rows) of the first rows 20a are oriented parallel to each other. The opposite inclination of the deflector elements 22 in the first and second rows is attained in that, related to the illustration in FIG. 2, the two central deflector elements 22 (which are part of the first rows 20a) are, for example, bent out of the plane of projection and the two adjacent outer deflector elements 22 are bent into the plane of projection.

In the configuration shown, the grid 14 includes exactly two central or first rows 20a, but provision may also be made for more first rows 20a, with the deflector elements 22 being inclined in the same direction. It is merely decisive that several first rows 20a having deflector elements 22 inclined in the same direction are arranged immediately next to each other and are adjacent at their outer edges to at least one or, if desired, several outer rows 20b which are inclined oppositely thereto. It should also be emphasized that the deflector elements 22 project in the downstream direction with respect to the grid 14.

Figure 3:
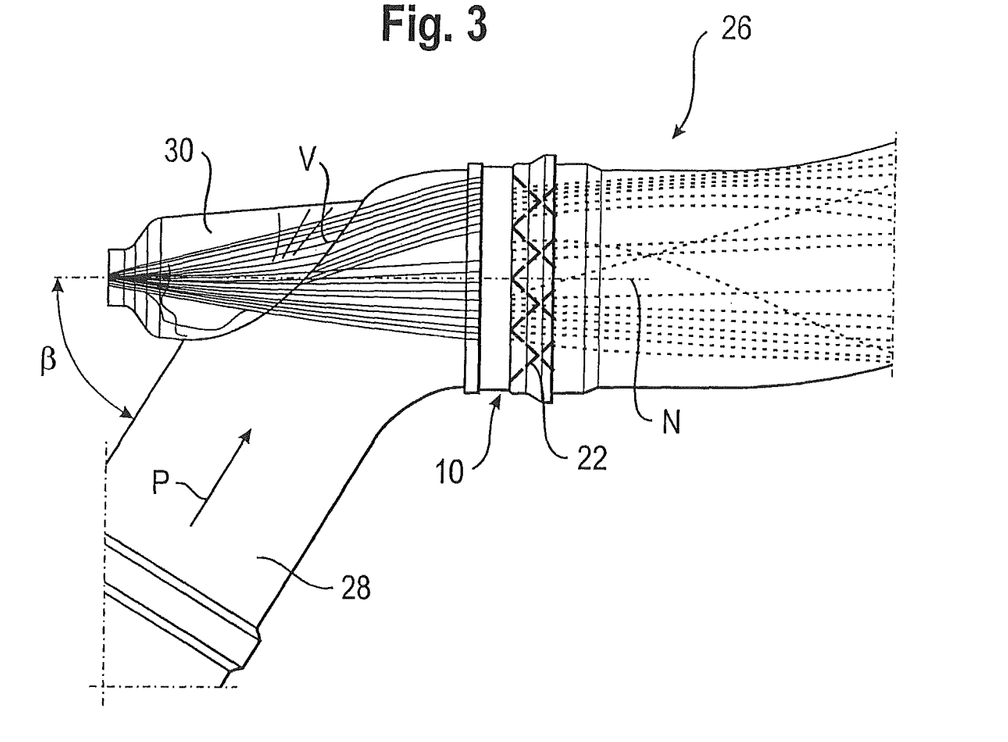
FIG. 3 shows a lateral view of an exhaust system according to the invention including the mixing element of FIG. 1.
Figure 4:
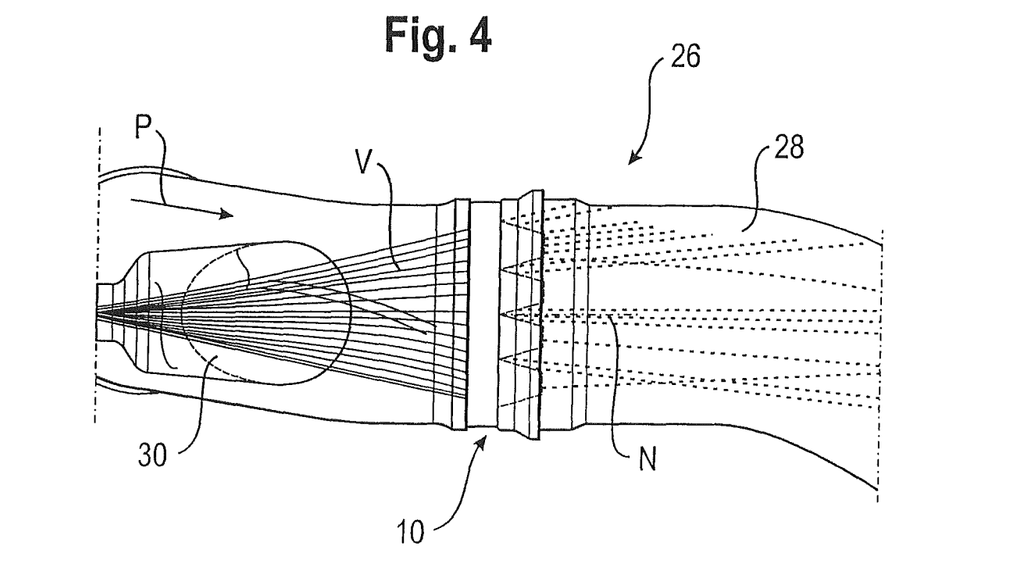
FIG. 4 shows a top view of the exhaust system of FIG. 3.

FIGS. 3 and 4 each show a portion of an exhaust system 26 according to the invention for an internal combustion engine, in particular a motor vehicle engine, the exhaust system including a tube 28 through which exhaust gas flows and a supply member 30 for a reducing agent, in this case an aqueous urea solution. The mixing element 10 is arranged downstream of the supply member 30 with respect to the flow direction of the exhaust gas indicated by the arrow P, the deflector elements 22 being positioned on the downstream side of the grid 14. On the downstream side, the grid plane normal N coincides with a longitudinal axis of the tube 28. A SCR catalytic converter not shown in the Figures is provided downstream of the mixing element 10.

Upstream of the mixing element 10, that is, on the side facing away from the deflector elements 22, the tube 28 is angled by 15 degrees to 60 degrees (angle β) in relation to the grid plane normal N, here by approximately 45 degrees. As appears from FIG. 3, the tube 28 is angled along the rows 20a, 20b; this means that the exhaust gas impinges roughly perpendicularly on the deflector elements 22, pointing downwards in the Figure, of the first rows 20a. The reducing agent, on the other hand, is supplied at an angle of between 15 degrees and 60 degrees to the inflow direction of the exhaust gas.

For the reduction of nitrogen oxides contained in the exhaust gas, in operation, an aqueous urea solution is introduced via the supply member 30 (distribution paths V), the urea solution being finely distributed and vaporized by the mixing element 10. In order to promote the vaporization of the urea solution and the conversion into ammonia, the deflector elements 22 or the entire mixing element 10 may include a catalytically active coating (not shown).

Figure 5A:
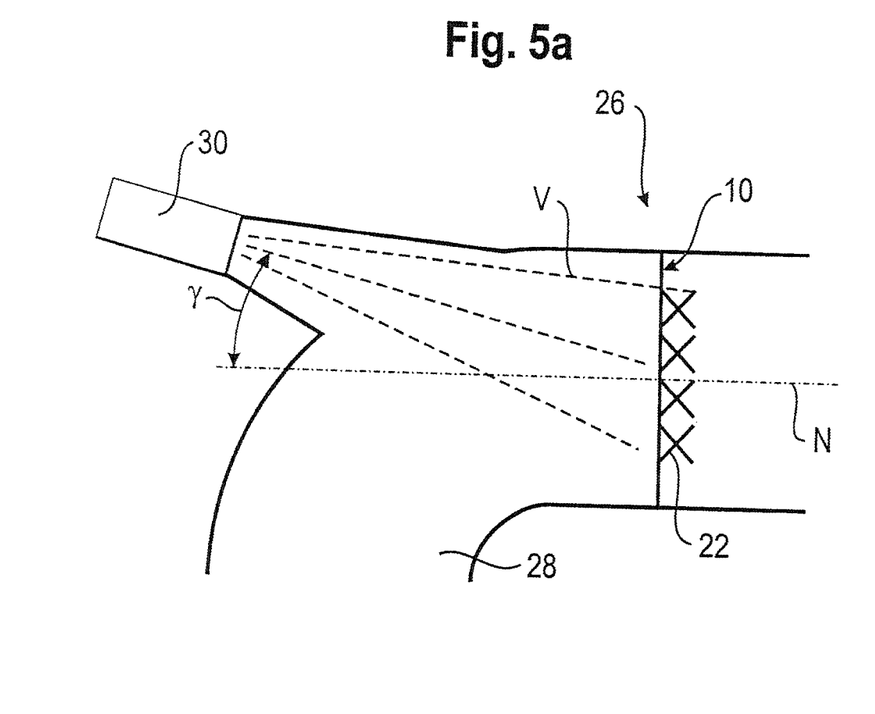
FIGS. 5a and 5b show a sectional view of an exhaust system which has been slightly modified as compared to FIG. 3 and, respectively, a view of the mixing element of FIG. 1.
Figure 5B:
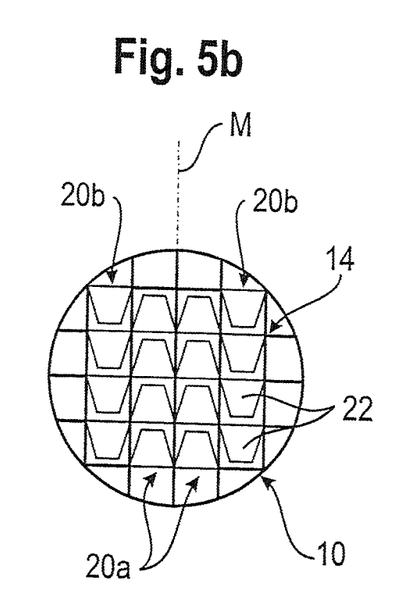

FIGS. 5a and 5b again schematically show an exhaust system 26 which has been slightly modified as compared to FIGS. 3 and 4, as well as the orientation of the associated mixing element 10 which corresponds to that of FIG. 1. This mixing element 10 is suitable in particular also when the reducing agent is not supplied in the axial direction (in this case the supply of the reducing agent is effected at an angle γ to the grid plane normal N).

FIGS. 6a, 6b and 7a, 7b show modified mixing elements 10 and the arrangement thereof in an exhaust system 26, which are advantageous when the reducing agent is supplied in the axial direction. Identical or functionally identical components are denoted by the same reference numerals here and only the differences from the embodiment already described will be discussed below.

Figure 6A:
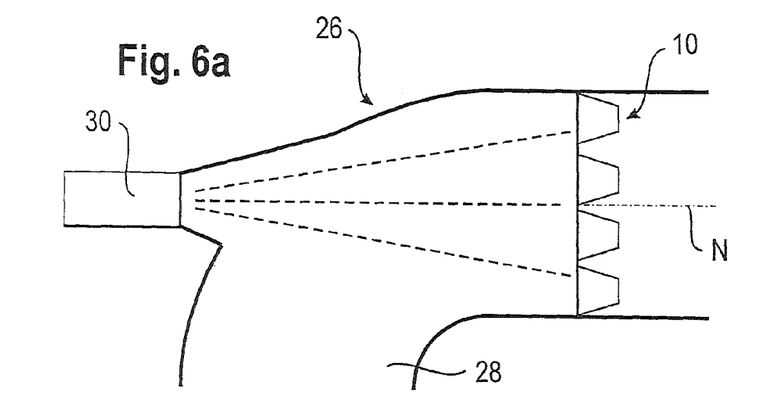
FIGS. 6a and 6b show a sectional view of a further exhaust system according to the invention and, respectively, a view of an associated mixing element.
Figure 6B:
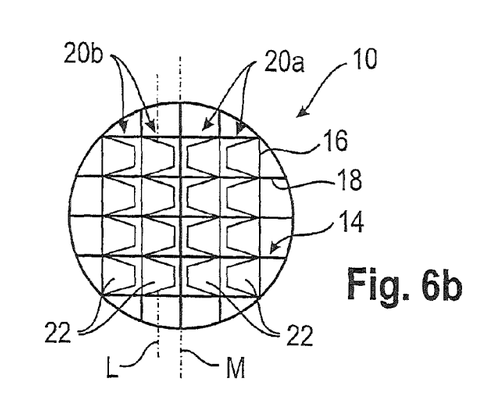

In the mixing element 10 of FIGS. 6a, 6b, the first rows 20a are arranged on the same side, here on the right-hand side, of a center axis M extending parallel to the longitudinal direction L of the rows, the free ends of the deflector elements 22 projecting from the grid 14 pointing towards the center axis. The deflector elements 22 are therefore inclined perpendicularly to the longitudinal direction L of the rows here and are attached to the first webs 16. The deflector elements of the second rows 20b, which here are arranged to the left of the center axis M, are inclined in the opposite direction to the deflector elements of the first rows 20a, their free ends thus likewise pointing towards the center axis M.

Figure 7A:
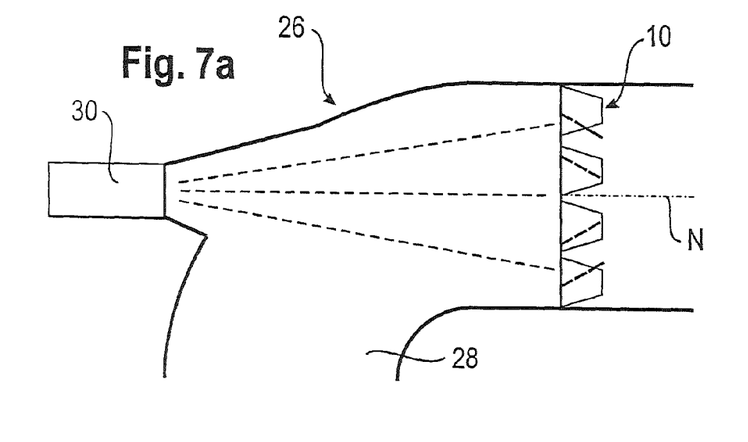
FIGS. 7a and 7b show a sectional view of a further exhaust system according to the invention and, respectively, a view of an associated mixing element.
Figure 7B:
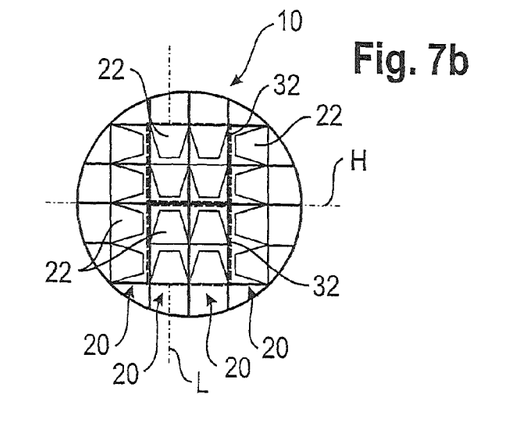

Rather than double rows with deflector elements 22 inclined in the same direction, the mixing element 10 according to FIGS. 7a and 7b includes two fields 32 each formed by four neighboring deflector elements 22 which are inclined in the same direction and not all of which are arranged in one row, and which are each framed by a square illustrated in broken lines. The deflector elements 22 of one respective field 32 constitute a rectangle, in this case in particular a square. The free ends of the deflector elements 22 of both fields point towards a horizontal center axis H, the two fields 32 being arranged in the two central rows 20 of the grid 14. Accordingly, the deflector elements 22 of the two fields 32 are inclined in opposite directions. The deflector elements 22 of the two adjacent outer rows 20 are again inclined perpendicularly to the longitudinal direction L of the rows and have their free ends pointing inwards, towards the fields 32.

FIGS. 8*a*, 8*b*, 8*c*, and 8*d* show further configurations of the mixing element 10 which are employed in particular in an upstream inlet region 34 of a catalytic converter 36 in order to "break up" the exhaust gas flow. It is not absolutely necessary here to supply a reducing agent.

Figures 8A, 8B, 8C, 8D, 9:
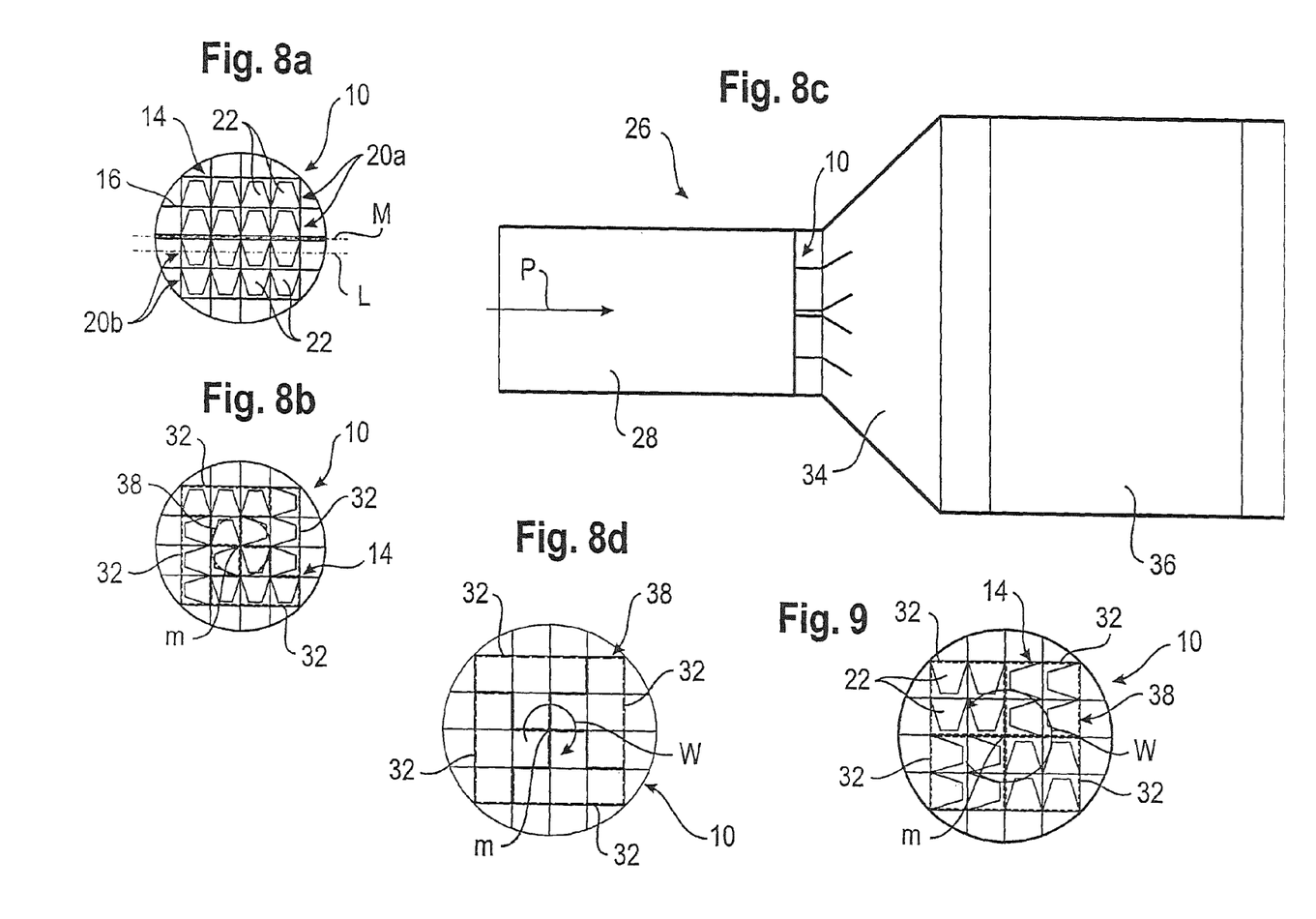
FIGS. 8a, 8b, 8c, and 8d show views of further mixing elements according to the invention, which are preferably employed immediately upstream of a catalytic converter, and a sectional view of a corresponding exhaust system.
FIG. 9 shows a view of a further mixing element according to the invention.

The mixing element 10 of FIG. 8*a* is very similar to that of FIG. 6*b*. Differences merely exist in the orientation of the deflector elements 22 (the free ends here point away from the center axis M). In addition, the mixing element 10 of FIG. 8*a* is installed rotated through 90 degrees, so that the center axis M and also the rows 20*a*, 20*b* extend horizontally.

Like that of FIG. 7*b*, the mixing element 10 of FIG. 8*b* includes a plurality of fields 32 each made up of four deflector elements 22 inclined in the same direction, the neighboring deflector elements 22 of each field 32 being arranged in a T-shape here. Furthermore, provision is made for a total of four such fields 32 which are arranged rotationally symmetrically to the center "m" of the grid 14 (see diagram in FIG. 8*d*). The neighboring innermost deflector elements 22 of the four fields 32 are arranged in a circular manner with regard to their inclination, by neighboring deflector elements 22 being oriented to be turned through 90 degrees in relation to each other. In this way, these innermost deflector elements 22 of the four fields 32 form an eddy-forming portion 38. The direction of the eddy is indicated by the arrow W.

Finally, FIG. 9 shows a mixing element 10 which serves to generate a large-area eddy. In this mixing element 10, four respective deflector elements 22 inclined in the same direction constitute a square field 32 each, with four fields 32 being arranged rotationally symmetrically to the center m of the grid 14. In this mixing element 10, the four fields 32, i.e. all 16 deflector elements 22, form an eddy-forming portion 38, with the deflector elements 22 adjacent in the direction of rotation of the eddy W being oriented turned through a maximum of 90 degrees in relation to each other.

By way of summary, it should be noted that the mixing element 10 of FIGS. 1 (or 5*b*, respectively), 6*b*, 7*b* and 8*a* are formed to be axially symmetrical to at least a center axis, whereas the mixing elements 10 of FIGS. 8*b* and 9 are made to be point symmetric or rotationally symmetric to the center m of the grid 14.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixing element for arrangement in an exhaust system of an internal combustion engine, comprising:
   a grid which includes a plurality of rows parallel to each other; and
   a plurality of deflector elements which project from the grid and are inclined in relation to a grid plane normal, and wherein all deflector elements in one row are inclined in the same direction and wherein the plurality of rows includes at least two first rows with the deflector elements of at least two immediately adjacent first rows being inclined in the same direction, and wherein deflector elements of rows adjacent to the at least two first rows are inclined in an opposite direction to those of the at least two first rows.

2. The mixing element according to claim 1, wherein adjacent deflector elements of the first rows are oriented parallel to each other.

3. The mixing element according to claim 1, wherein the at least two first rows are middle rows.

4. The mixing element according to claim 1, wherein the at least two first rows are rows which are arranged on the same side of a center axis extending parallel to a longitudinal direction of the plurality of rows.

5. The mixing element according to claim 1, wherein the grid is axially symmetrical to a center axis extending parallel to a longitudinal direction of the plurality of rows.

6. A mixing element, for arrangement in an exhaust system of an internal combustion engine, comprising:
   a grid which includes a plurality of rows parallel to each other;
   a plurality of deflector elements which project from the grid and are inclined in relation to the grid plane normal; and at least one eddy-forming portion which is constituted by at least four adjacent fields which are each made up of a plurality of adjacent deflector elements inclined in the same direction, and wherein the at least four adjacent fields are arranged in a circular manner with respect to the inclination of the deflector elements thereof, by deflector elements of the eddy forming portion which are lying adjacent to each other in the direction of rotation of the eddy being oriented to be turned relative to each other by a maximum of 90 degrees.

7. The mixing element according to claim 6, wherein four fields formed by deflector elements are provided, which are arranged rotationally symmetrically to a center of the grid.

8. The mixing element according to claim 6, wherein the plurality of deflector elements are formed in one piece with the grid.

9. The mixing element according to claim 6, wherein deflector elements in an edge region of the grid have a different angle of inclination from deflector elements in a central region.

10. The mixing element according to claim 6, wherein the plurality of deflector elements include a catalytically active coating.

11. The mixing element according to claim 6, wherein the grid is formed by a plurality of first and second webs, the first webs being arranged perpendicularly to the second webs.

12. The mixing element according to claim 11, wherein the first webs define the plurality of rows.

13. The mixing element according to claim 11, wherein the plurality of deflector elements are attached to the second webs.

14. The mixing element according to claim 11, wherein the plurality of deflector elements are attached to the first webs.

15. An exhaust system for an internal combustion engine, comprising:
   a tube through which exhaust gas flows;
   a supply member for a reducing agent; and
   a mixing element comprising a grid which includes a plurality of rows parallel to each other, and a plurality of deflector elements which project from the grid and are inclined in relation to a grid plane normal, and wherein all deflector elements in one row are inclined in the same direction and wherein the plurality of rows includes at least two first rows with the deflector elements of at least two immediately adjacent first rows being inclined in the same direction, and including a plurality of first webs that are parallel to each other and a plurality of second webs arranged perpendicularly to the plurality of first webs, the first and second plurality of webs being fixed to a frame to form the grid, and wherein the plurality of rows are defined by the first plurality of webs.

16. The exhaust system according to claim 15, wherein the tube is angled upstream of the mixing element.

17. A mixing element for arrangement in an exhaust system of an internal combustion engine, comprising:
    a grid which includes a plurality of rows parallel to each other;
    a plurality of deflector elements which project from the grid and are inclined in relation to a grid plane normal, and wherein all deflector elements in one row are inclined in the same direction and wherein the plurality of rows includes at least two first rows with the deflector elements of at least two immediately adjacent first rows being inclined in the same direction; and
    a plurality of first webs that are parallel to each other and a plurality of second webs arranged perpendicularly to the plurality of first webs, the first and second plurality of webs being fixed to a frame to form the grid, and wherein the plurality of rows are defined by the first plurality of webs.

18. The mixing element according to claim 17, wherein the at least two first rows are middle rows that are immediately adjacent to each other and which have deflector elements all inclined in the same direction.

\* \* \* \* \*